(12) United States Patent
Nien et al.

(10) Patent No.: US 7,984,666 B2
(45) Date of Patent: Jul. 26, 2011

(54) APPARATUS FOR CUTTING A WINDOW COVERING

(75) Inventors: Ming Nien, Taichung (TW); Wen-Yeu Lee, Taichung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 486 days.

(21) Appl. No.: 12/032,687

(22) Filed: Feb. 17, 2008

(65) Prior Publication Data

US 2009/0078101 A1 Mar. 26, 2009

(30) Foreign Application Priority Data

Sep. 26, 2007 (CN) ...................... 2007 2 0125571 U

(51) Int. Cl.
*B26D 7/01* (2006.01)
(52) U.S. Cl. ................ 83/468; 83/523; 83/746
(58) Field of Classification Search .............. 83/468, 83/452, 454, 455, 464, 523, 522.11, 522.19, 83/613, 616, 618, 620, 623, 625, 626, 629, 83/632, 633, 468.4–468.7, 459, 746, 749, 83/753, 758, 762, 766, 775, 603; 29/24.5
See application file for complete search history.

(56) References Cited

U.S. PATENT DOCUMENTS

| | | | | |
|---|---|---|---|---|
| 5,927,172 A * | 7/1999 | Wang | | 83/454 |
| 6,079,306 A * | 6/2000 | Liu | | 83/454 |
| 6,182,549 B1 * | 2/2001 | Albright et al. | | 83/454 |
| 6,758,120 B2 * | 7/2004 | Marocco | | 83/52 |
| 6,877,409 B2 * | 4/2005 | Huang et al. | | 83/52 |
| 2005/0045012 A1* | 3/2005 | Nien | | 83/517 |
| 2005/0150344 A1* | 7/2005 | Nien et al. | | 83/651 |
| 2005/0188801 A1* | 9/2005 | Marocco | | 83/13 |
| 2006/0156882 A1* | 7/2006 | Kollman et al. | | 83/167 |
| 2007/0169601 A1* | 7/2007 | Yu et al. | | 83/452 |

* cited by examiner

*Primary Examiner* — Phong H Nguyen
(74) *Attorney, Agent, or Firm* — Ming Chow; Sinorica, LLC

(57) ABSTRACT

A Window covering cutter has its base board installed with a first clamping device for clamping a Window covering, and a knife device that is positioned next to the first clamping device, having a cutting opening, a driving plate movably fixed at a side of the cutting opening, and a knife fixed on the driving plate to reciprocate transversely to cut the Window covering. A measuring device is set at one side of the knife device for stably positioning the Window covering and measuring a length between its blocking plate and the cutting opening, providing a swift and precise measurement for cutting. So, the invention can be easily operated to esthetically cut a Window covering.

12 Claims, 5 Drawing Sheets

APPARATUS FOR CUTTING A WINDOW COVERING

BACKGROUND OF THE INVENTION

1. Field of the Invention

This invention relates to an apparatus for cutting a Window covering, particularly to one needing only a small space to place or operate, and convenient to move, install and cut.

2. Description of the Prior Art

As there is no standard specification for windows, the desired width of a Window covering must be cut in advance by an exclusive cutter before the Window covering is positioned on a window. The apparatus for cutting a Window covering used earlier is not only bulky, but also requires a high cost in manufacturing and transportation. The conventional apparatus for cutting a Window covering is generally categorized as either a vertical one or a horizontal one, both having complicated operating procedures. In order to make the apparatus for cutting a Window covering in a reduced size and being operated more conveniently, some improvements, such as those disclosed in U.S. Pat. Nos. 6,681,673, 7,114,421 and 6,334,379, have been devised to overcome the defects.

In the U.S. Pat. No. 6,681,673, it is provided with a main body having a clamping base to fixedly hold a Window covering. A cutting unit is installed in the main body and is used to be moved for cutting the Window covering. When a Window covering is to be cut, the head rail, bottom rail and slats have to be put to contact with a base board simultaneous. A blade of the cutting member must be kept in parallel with the base board in a preset angle so as to contact and cut down the head rail, bottom rail and slats at the same time. Because the top rail, the bottom rail and the slats of the Window covering may be made of different materials, and therefore they could be cut unevenly or being damaged in sections. In addition, because the cutting unit is tilted when moving to and from, it still needs a space with a certain height to accommodate the cutter. As such, this type of cutter is still not ideal.

In the U.S. Pat. No. 7,114,421, it is provided with a main body that has a clamping member for the window covering to lean on, and a cutting base provided with a knife for cutting a Window covering. It has achieved the purpose of reducing its size and convenience of operations. However, during the operations, the head rail, the bottom rail and the slats have to be cut respectively. That is, the head rail and the bottom rail are cut first followed by the slats. Finally, the portions of the head rail and the bottom rail which is longer than the slats are again to be cut off. Therefore, the total length of the head rail and the bottom rail to be cut off twice must be equivalent to those of the slats being cut off once. A user has to calculate the length of and manually adjust the portion of the Window covering to be cut off. Therefore, further improvements for the U.S. Pat. No. 7,114,421 would be desirable.

And, in U.S. Pat. No. 6,334,379, it is provided with a main body having a clamping base to fixedly hold a Window covering. A cutting unit is installed in the center of the main body and is able to be turned for cutting the Window covering. Although, this invention has achieved the purpose of reducing the size and increasing the convenience of operations. A post is inserted into a recess of the head rail of the Window covering to let the other end of the post clamping the Window covering fixedly. But, this invention still cannot perform a good cutting job as the circumferential wall of the recess of the head rail does not always have sufficient strength to support the post. Besides, if the clamping force is too strong, the head rail can easily be deformed. Therefore, further improvements for the U.S. Pat. No. 6,334,379 would be desirable.

SUMMARY OF THE INVENTION

The invention of the Window covering cutter includes a base, on which a first clamping assembly for clamping a Window covering is installed and a knife assembly that is positioned next to the first clamping assembly. The knife assembly has a cutting opening and a driving plate movably fixed on said knife assembly. The driving plate moves perpendicularly along the moving path of the window covering and cuts said window covering from a rail to the other rail. A measuring assembly is positioned on said base behind the knife assembly. An adjusting seat is pivotally connected with a blocking plate that is extended toward to and correspond to the cutting opening.

The invention of the Window covering cutter includes a blocking plate to restrict the front end of the Window covering. The position of the knife can be easily located without any extra measurement in order for cutting a window covering steadily and easily.

BRIEF DESCRIPTION OF DRAWINGS

This invention is better understood by referring to the accompanying drawings, wherein.

DETAILED DESCRIPTION OF THE PREFERRED EMBODIMENT

Figure 1:
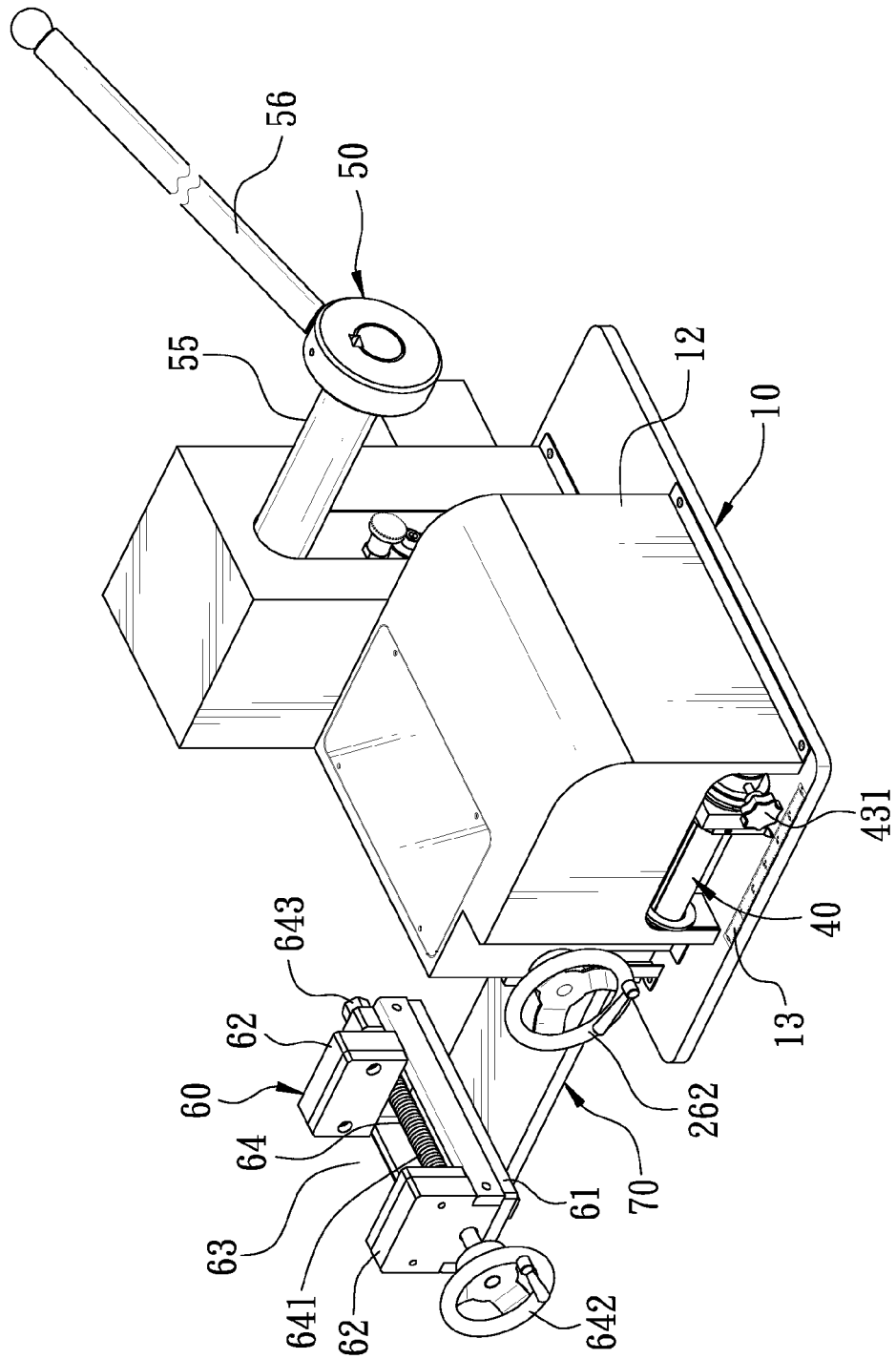
FIG. 1 is a three-dimensional view of a preferred embodiment of a Window covering cutter in the present invention.
Figure 2:
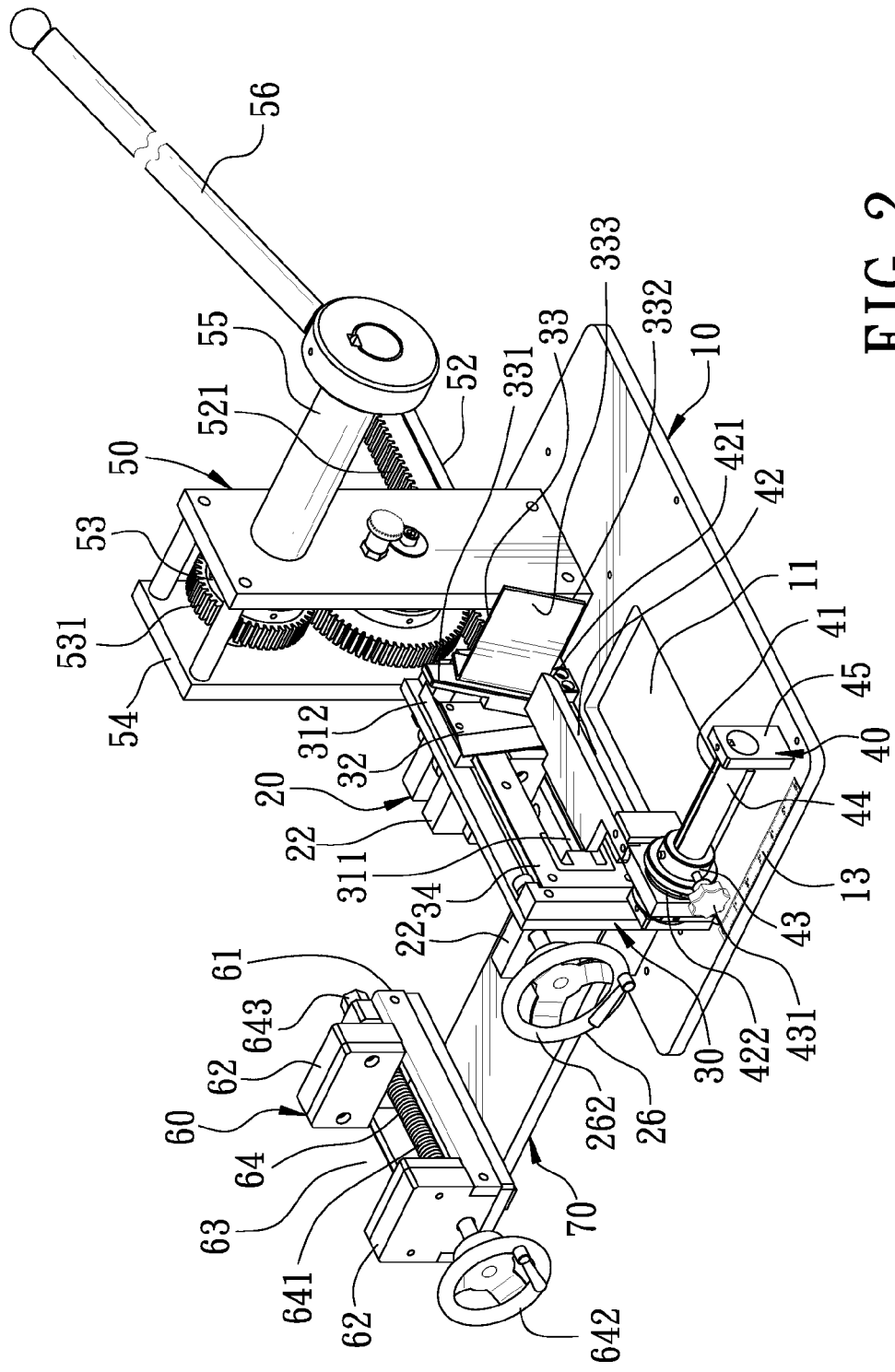
FIG. 2 is a perspective view of the preferred embodiment of a Window covering cutter in the present invention.
Figure 3:
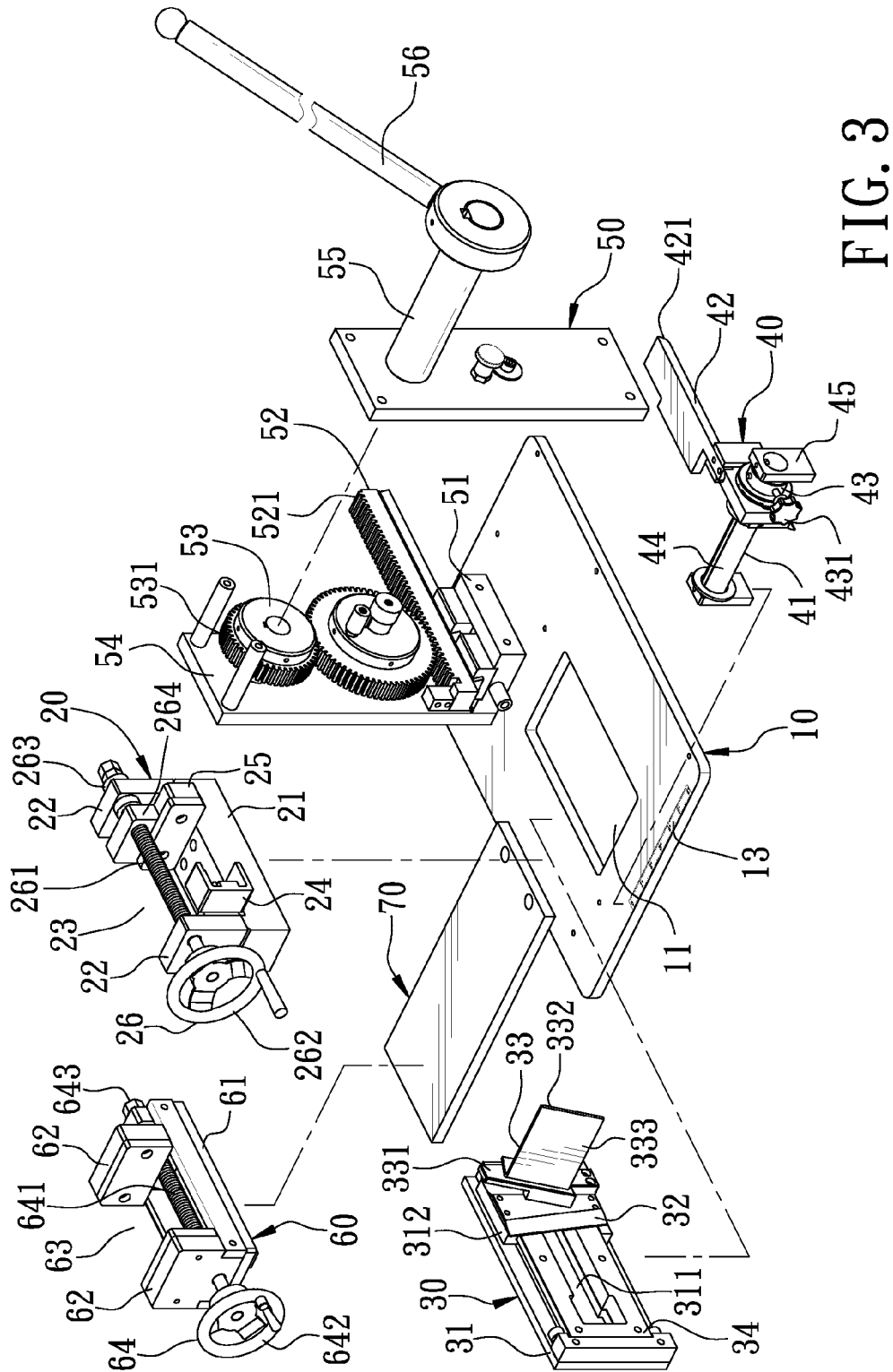
FIG. 3 is an exploded perspective view of the preferred embodiment of a Window covering cutter in the present invention.

As shown in FIGS. 1~3, a preferred embodiment of the present invention includes a base 10, a first clamping assembly 20, a knife assembly 30, a measuring assembly 40, a driving assembly 50 and a second clamping assembly 60.

The base 10 is formed in rectangular with a preset thickness. A waste opening 11 is appropriately bored in the center of the base. A cover 12 is position on the base.

The first clamping assembly 20 is provided with a rectangular first seat 21 and is positioned on a preset position of the base 10. Two rectangular clamping blocks 22 are vertically located at two sides of the first base 21 respectively. A first through groove 23 is formed between the clamping blocks 22 with an opening facing up for a Window covering to pass through so that, during operations, a head rail and a bottom rail of the Window covering can lean against the clamping blocks 22. An adjusting block 24 is set at the left side of the first through groove 23 to clamp the head rail of the Window covering. Another adjusting block 25 is set at the right end of the first through groove 23 to clamp the bottom rail of the Window covering. A first control device 26 pivotally connects the clamping blocks 22. An adjusting element 261 is used to adjust the position of the clamping block 22. The adjusting element 261 is a threaded rod and is inserted from outside of the left clamping block 22 through the first through groove 23 to the outside of the right clamping block 22. The adjusting element 261 is also provided with a control element 262 that is fixed at the left end of the adjusting element 261. The control device 26 is a wheel with an adjusting ring 263 being threadably engaged with the adjusting element 261 outside of the right clamping block 22. A supplemental adjusting block 264 is threadably engaged with the adjusting element 261 at the inside of the right clamping block 22. By rotating the control element 262, adjusting element 261, and the adjusting ring 263, the right clamping block 22 moves toward the left clamping block 22 along the first through groove 23 to adjust the width of the said first through groove 23.

The knife assembly 30 is positioned on the base 10 behind the first clamping assembly 20 and is provided with a knife seat 31 that has a cutting opening 311 being aligned with the first through groove 23. The first clamping assembly 20 allows the Window covering being inserted through the first through groove 23. A driving plate 312 is movably positioned at the right side of the knife seat 31 The driving plate moves reciprocatedly in a direction that is perpendicular to the moving direction of the Window covering. A rectangular knife 32 is fixed on and driven by the driving plate 312 to transversely cut a Window covering from the head rail to the bottom rail. A guiding device 33 is positioned at the outside of the rectangular knife 32 and is tilted downward. The guiding device comprises a trapezoid plate 331 that is positioned vertically and an L-shaped plate 332 having its bottom portion being connected with the outside of the trapezoid plate 331. A pushing surface 333 is formed on the surfaces of the trapezoid plate 331 and the L-shaped plate 332. The pushing surface is formed at opposite side of the cutting opening 311. A mold plate 34 is provided in the knife assembly 30 and is located behind the knife seat 31 in order for corresponding to the rear side of the first clamping assembly 20. The mold plate 34 can be replaced with those having corresponding shapes of the head rail and the bottom rail of a Window covering.

The measuring assembly 40 is vertically located behind the left side of the knife assembly 30 and is parallel with the guiding device 33. The measuring assembly 40 comprises of an adjusting seat 41 and a blocking plate 42. The blocking plate 42 is pivotally connected with the front of the adjusting seat 41 to transversely correspond to the cutting opening 311. The blocking plate is positioned toward the knife seat 31 of the knife device 30 for stopping the Window covering and ensuring the measurement for the cutting. The blocking plate 42 is a board having its one end pivotally connected to the front end of the adjusting seat 41, and the other end extending toward the pushing surface 333. The blocking plate 42 has its right end being formed as an arc-like surface 421 to lean against the pushing surface 333 of the guiding device 33. The blocking plate 42 is a protrudent board and is set transversely toward the cutting opening 311. The blocking plate 42 has its bottom corresponding to the waste opening 11 and can be moved, by operating the adjusting device 43, for adjusting the distance between the blocking plate and the cutting opening 311. The adjusting device 43 is mounted around the adjusting seat 41. The adjusting seat 41 is provided with a rod 44 that is transversely positioned, and a rectangular plate 45 which is fixed at two ends of the rod 44 respectively for fixing the adjusting base 41 on the base 10. The adjusting device 43 is a ring like device and is mounted around the front end of the rod 44 where is adjacent to the blocking plate 42. The adjusting device is provided with a control element 431 as a knob that is located at its left side in order to adjust the position of the adjusting ring along the rod 44 for altering the distance between the blocking plate 42 and the cutting opening 311. The blocking plate 42 is provided with a spring 422 that is mounted around the rod 44 of the adjusting seat 41 in order to keep the blocking plate 42 being elastically pressed and recovering its original position. A scale 13 is formed on the base 10 and is located at the left side of the rod 44 for measuring a length of the Window covering to be cut.

The driving assembly 50 is vertically installed at the right side of the knife assembly 30 and is provided with an adjusting seat 51 and a driving set 52. The driving set is located on the adjusting seat 51 and is next to the knife assembly 30. The driving set 52 is extended to control the driving plate 312 of the knife seat 31. The driving set 52 is provided with a gear rack 521 that is engaged with a planetary gear set 53. The planetary gear is pivotally fixed on one side of a plate 54 and is provided with two gears 531 vertically engaged with each other. The upper gear 531 is pivotally connected with an operating set 55 at its center. The operating set is employed to turn around the planetary gear set 53. A rotating arm 56 is installed vertically at the end of the operating set 55 and turns the operating set 55 to handle the driving set 52.

The second clamping assembly 60 is transversely fixed on a front portion of a supporting board 70. The supporting board has its rear end being positioned on and near the center of the base 10 as well as being adjacent to the front of the first clamping assembly 20. The second clamping assembly is positioned in parallel with the second clamping assembly 60. The second clamping assembly 60 is also provided with a second seat 61 and two rectangular clamping blocks 62. The rectangular blocks are vertically and upward positioned at two sides of the second base 61 respectively. A second through groove 63 is formed between the clamping blocks 62 and corresponding to the first through groove 23 for a Window covering to pass through so that a head rail and a bottom rail of the Window covering can lean against the clamping blocks 62. The clamping blocks 62 are pivotally connected with a second control device 64. The second control device 64 is provided with an adjusting element 641 that is a threaded rod. The adjusting element 641 is installed underneath the clamping blocks 62 and is inserted from outside of the bottom of the left clamping block 62, through the second through groove, to outside of the bottom of the right clamping block 62. A control element 642 is connected at one end of the threaded rod 641 outside of the left clamping block 62. An adjusting ring 643 is engaged with the threaded rod 641 outside of the right clamping block 62 for turning the control element 642 to move the clamping block 62 so that the width of the second through groove 63 is adjusted.

For a better understanding of the invention including its structure and its operating advantages, the operation procedures, divided into seven steps, are described below.

The first step (1) is to stack up slats 80 of the Window covering and keep them being sandwiched between a head rail 81 and a bottom rail 82, and fold the Window covering into a minimum size.

The second step (2) is to measure the length of the Window covering to be cut off. Next, handle the control element 431 of the measuring assembly 40 to move the adjusting device 43 to a reading of the scale 13 for the Window covering to be cut off. By the time, the blocking plate 42 is simultaneously moved to the desired reading of the scale 13 to make the preset distance between the front end of the blocking plate 42 and the cutting opening 311 of the knife seat 31.

Figure 4:
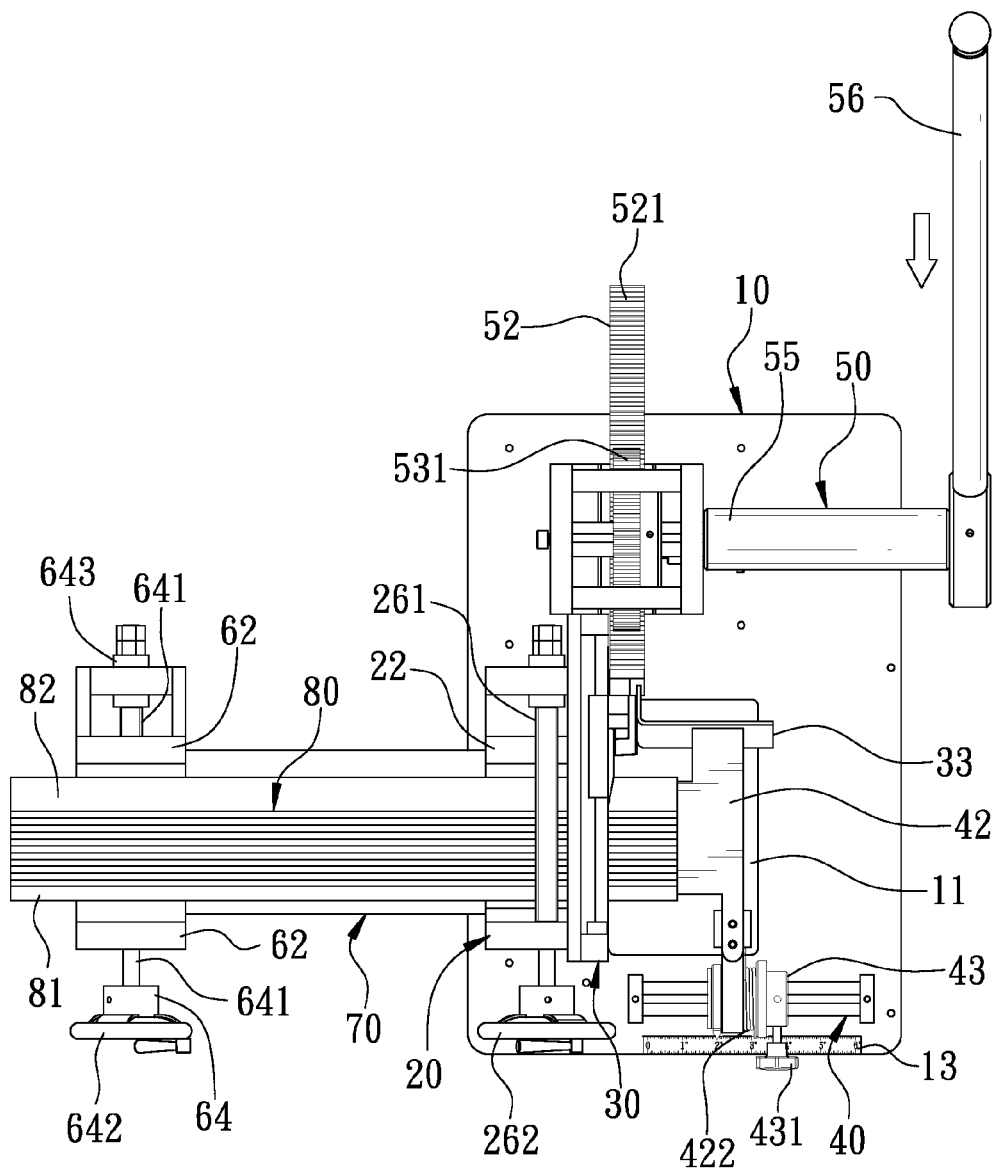
FIG. 4 is a top view of the preferred embodiment of a Window covering cutter in the present invention, shows cutting operation.

As shown in FIG. 4, the third step (3) is to transversely put the Window covering on the supporting board 70, keeping the front end and the rear end of the Window covering being placed in the first through groove 23 and the second through groove 63 respectively. The head rail 81 and the bottom rail 82 are corresponding to the adjusting block 24 of the first clamping assembly 20 and the adjusting block 25 of the first clamping assembly 20 respectively. Then, move the front end of the Window covering into the cutting opening 311 to lean on the blocking plate 42 and confirm the length between the cutting opening 311 and the blocking plate 42 of the Window covering to be cut off.

The fourth step (4) is to handle the control elements 262 and 642 of the first clamping assembly 20 and the second clamping assembly 60 respectively to fixedly position the Window covering.

Figure 5:
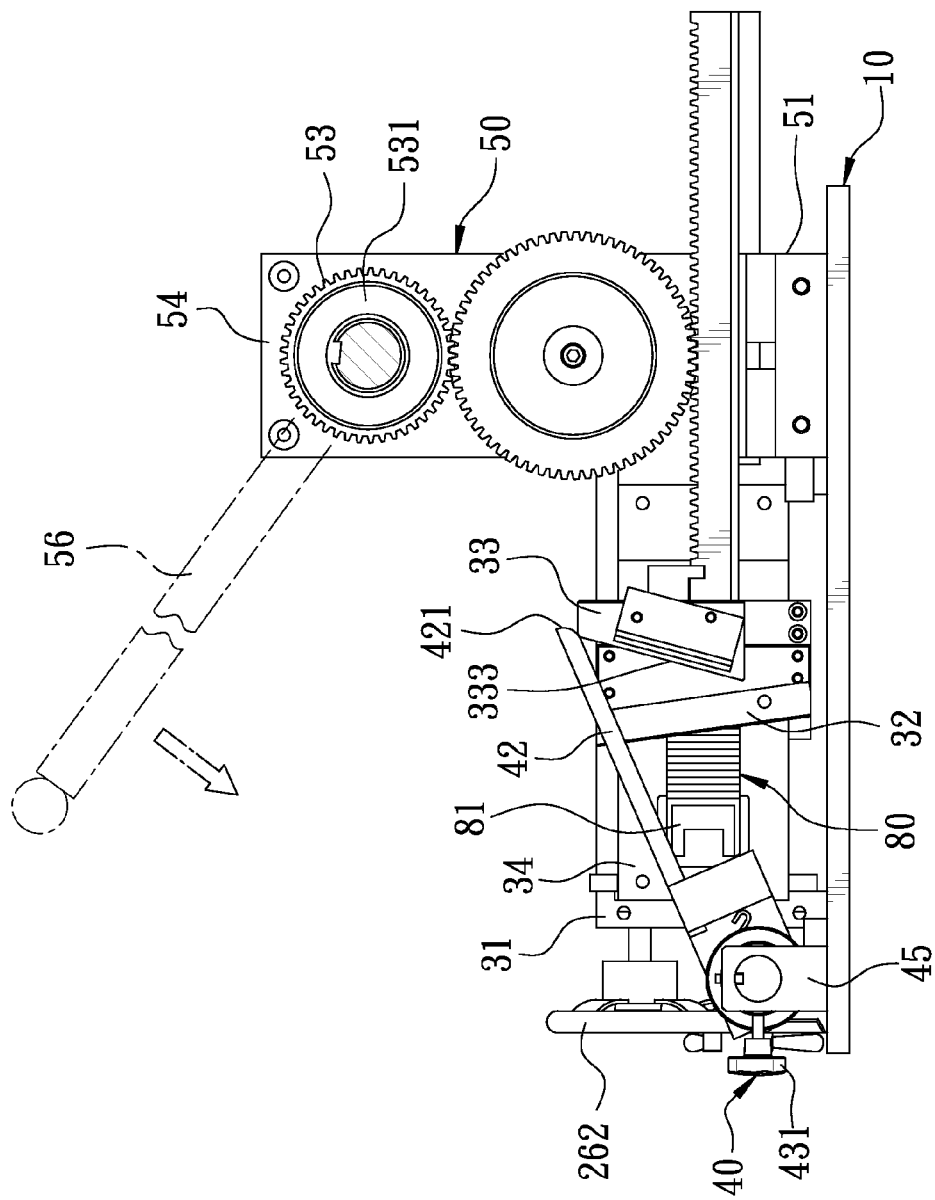
FIG. 5 is a right side view of the preferred embodiment of a Window covering cutter in the present invention, shows how a measuring device works while operating.

The fifth step (5) is to turn the rotating arm 56 of the driving assembly 50 counterclockwise to enable the driving set 52 gradually being moved toward the rectangular knife 32. The rectangular knife 32 of the knife seat 31 is successively driven by the driving set 52 to transversely cut the Window covering from the bottom rail 82 through to the head rail 81. As shown in FIG. 5, the guiding device 33 of the rectangular knife 32 is positioned at a preset angle against the moving direction of the driving plate 312. The arc-like surface 421 of the blocking plate 42 is smoothly pushed up along and by the pushing surface 333 so that the rectangular knife 32 coming after the guiding device 33 does not interfere with the blocking plate 42.

The sixth step (6) is that the portion of the Window covering being cut off is dropped down through the waste opening 11 without being blocked by the blocking plate 42 when the blocking plate is pushed up at a higher level.

The seventh step (7) is to turn the rotating arm 56 of the driving assembly 50 clockwise in order to return the rectangular knife 32 to its original position. By the time, the blocking plate 42 is also returned to its original position by either the elasticity of the spring 422 or by the gravity. Then, releasing the first clamping assembly 20 and the second clamping assembly 60 to unload the Window covering for packing.

A variety of the mold plates 34 for the head rail 81 and the bottom rail 82 can be optionally used in order to keep the space between the Window covering and the cutting opening 311 minimized and making the Window covering being cut stably.

The current invention has the following advantages as can be seen from the disclosure above.

1. The cutter of the invention is small and can be assembled and moved easily for achieving a simple and quick operation.

2. With the measuring assembly 40, an advance measurement of the length of the Window covering to be cut off, a precise cutting job can be easily performed as long as the Window covering is properly placed on the cutter. Driven by the driving assembly 50, the knife assembly 30 can be operated with less force and time. And, with the guiding device 33 of the knife assembly 30 to lean against the blocking plate 42, the blocking plate 42 can effectively keep the front end of the Window covering being positioned accurately.

3. With a variety of the mold plates 34 to be optionally used in order to keep the space between the Window covering and the cutting opening 311 minimized, the Window covering can be steadily and precisely cut.

While the preferred embodiment of the invention has been described above, it will be recognized and understood that various modifications may be made therein and the appended claims are intended to cover all such modifications that may fall within the spirit and scope of the invention.

What is claimed is:

1. An apparatus for cutting a window covering comprising:
   a base;
   a first clamping assembly located on a preset position of said base and having a first seat;
   a first through groove formed on said first seat to pass through along a major axis of said window covering;
   two first clamping blocks positioned on the first seat for a head rail and a bottom rail of said window covering to lean on respectively and defining the first through groove;
   a first controlling device located on said first seat for adjusting the two first clamping blocks for clamping the window covering;
   a knife assembly positioned on said base adjacent to said first clamping device and provided with a knife base that has a cutting opening align with said first through groove for said window covering coming from said first through groove to extend out;
   a driving plate sliding relative to said knife base and moving along a perpendicular moving path toward said window covering;
   a knife being fixed on and driven by said driving plate to transversely cut said window covering;
   a measuring assembly being positioned on a preset location of said base behind said knife assembly and provided with a seat that is pivotally connected with a blocking plate extended toward to and correspond to said cutting opening for stopping said window covering and as a benchmark for measuring a length of said window covering to be cut off;
   the knife assembly comprising a guiding device fixed on said driving plate for leading said blocking plate of said measuring assembly to move away from said cutting opening;
   said blocking plate of said measuring assembly is a plate, and have an arcuate surface at an end of the plate corresponding to a pushing surface of said guiding device; and
   a driving assembly being positioned on said base adjacent to said knife assembly and provided with a driving set to control said driving plate of said knife assembly, and an operating set being used for controlling said driving set.

2. The apparatus for cutting a window covering as claimed in claim 1, further comprising a second clamping assembly is positioned on said base opposite to said first clamping device and provided with a second seat, a second through groove formed on said second seat for said window covering to pass therethrough, two second clamping blocks positioned on the second seat for said head rail and said bottom rail of said window covering to lean against respectively and defining the first through groove, a second control device located on said second seat for adjusting the two second clamping blocks for clamping the window covering.

3. The apparatus for cutting a window covering cutter as claimed in claim 2, wherein said second controlling device of said second clamping assembly comprising an adjusting element used to adjust the positions of said clamping blocks and a control element used to rotate of said adjusting element.

4. The apparatus for cutting a window covering cutter as claimed in claim 1, wherein said first controlling device of said first clamping assembly comprising an adjusting element used to adjust the positions of said clamping blocks and a control element used to rotate of said adjusting element.

5. The apparatus for cutting a window covering cutter as claimed in claim 4, wherein said adjusting element of said first clamping assembly is a threaded rod.

6. The apparatus for cutting a window covering cutter as claimed in claim 4, wherein said control element of said first clamping assembly is a wheel.

7. The apparatus for cutting a window covering cutter as claimed in claim 1, wherein said seat of said measuring assembly comprising a rod that is pivotally connected with an adjusting device for adjusting the position of said blocking plate, a control element used for locking the adjusting device at a position on the rod.

8. The apparatus for cutting a window covering cutter as claimed in claim 1, wherein said guiding device of said knife assembly is a plate having a preset angle with a moving direction of said driving plate so as to smoothly push up said blocking plate.

9. The apparatus for cutting a window covering cutter as claimed in claim 1, wherein said driving set of said driving assembly is a gear rack and a planetary gear set engaged on said gear rack.

10. The apparatus for cutting a window covering cutter as claimed in claim 1, wherein said operating set of said driving assembly is a rod, and a rotating arm extend vertically outward and at an end of said rod for turning around said rod so as to operate said driving set.

11. The apparatus for cutting a window covering cutter as claimed in claim 1, wherein said base having a waste opening in front of said cutting opening so as to drop down a portion of said window covering cut off.

12. The apparatus for cutting a window covering cutter as claimed in claim 1, wherein said blocking plate of said measuring assembly further having a spring being mounted around a rod of said seat.

* * * * *